June 8, 1926.  1,588,114
F. E. KEMPPEL ET AL
METHOD OF MANUFACTURING TIRES
Original Filed Sept. 7, 1922   2 Sheets-Sheet 1
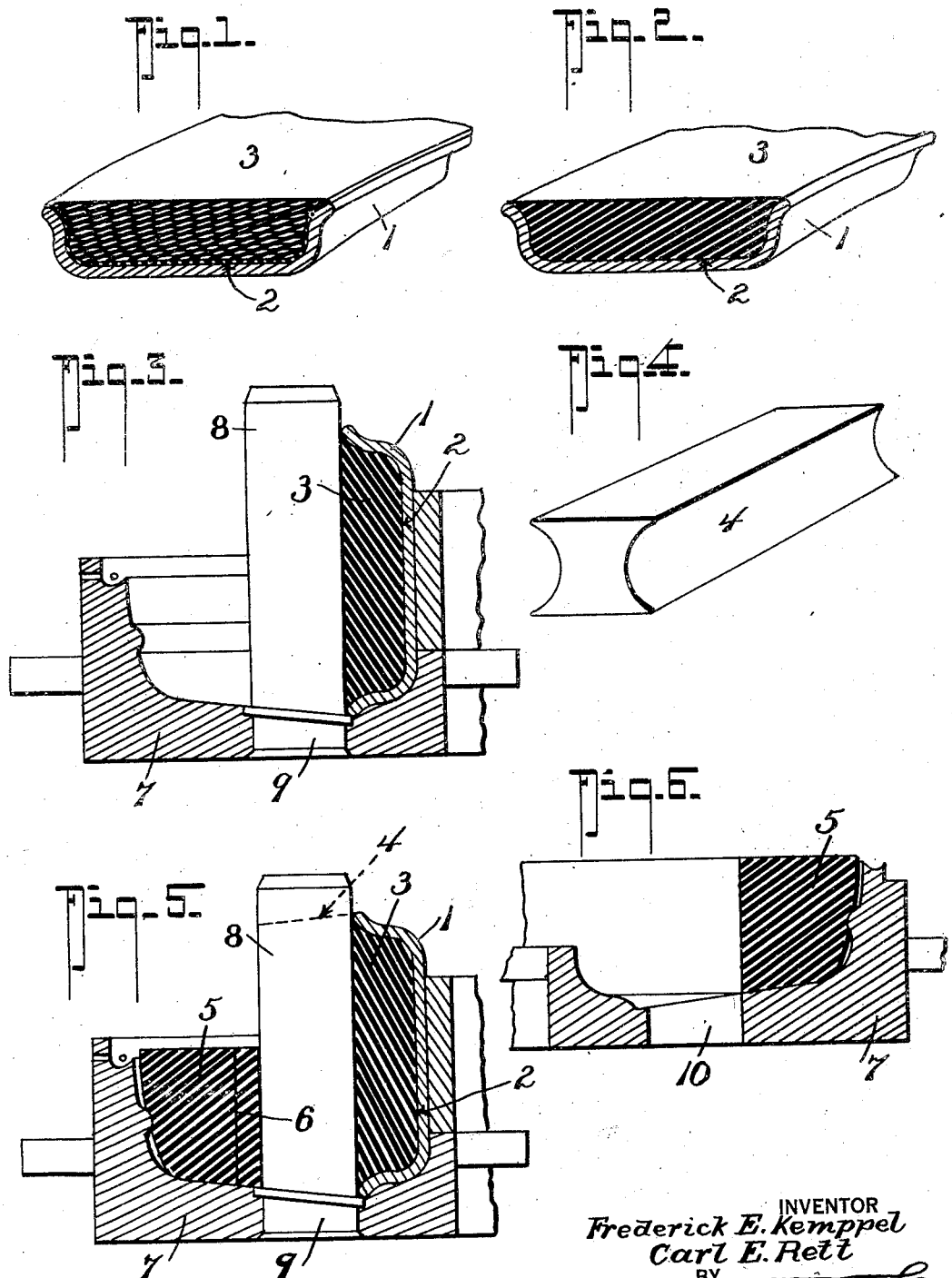
INVENTOR
Frederick E. Kemppel
Carl E. Rett
BY
Fred G. Dieterichs Co.
ATTORNEYS

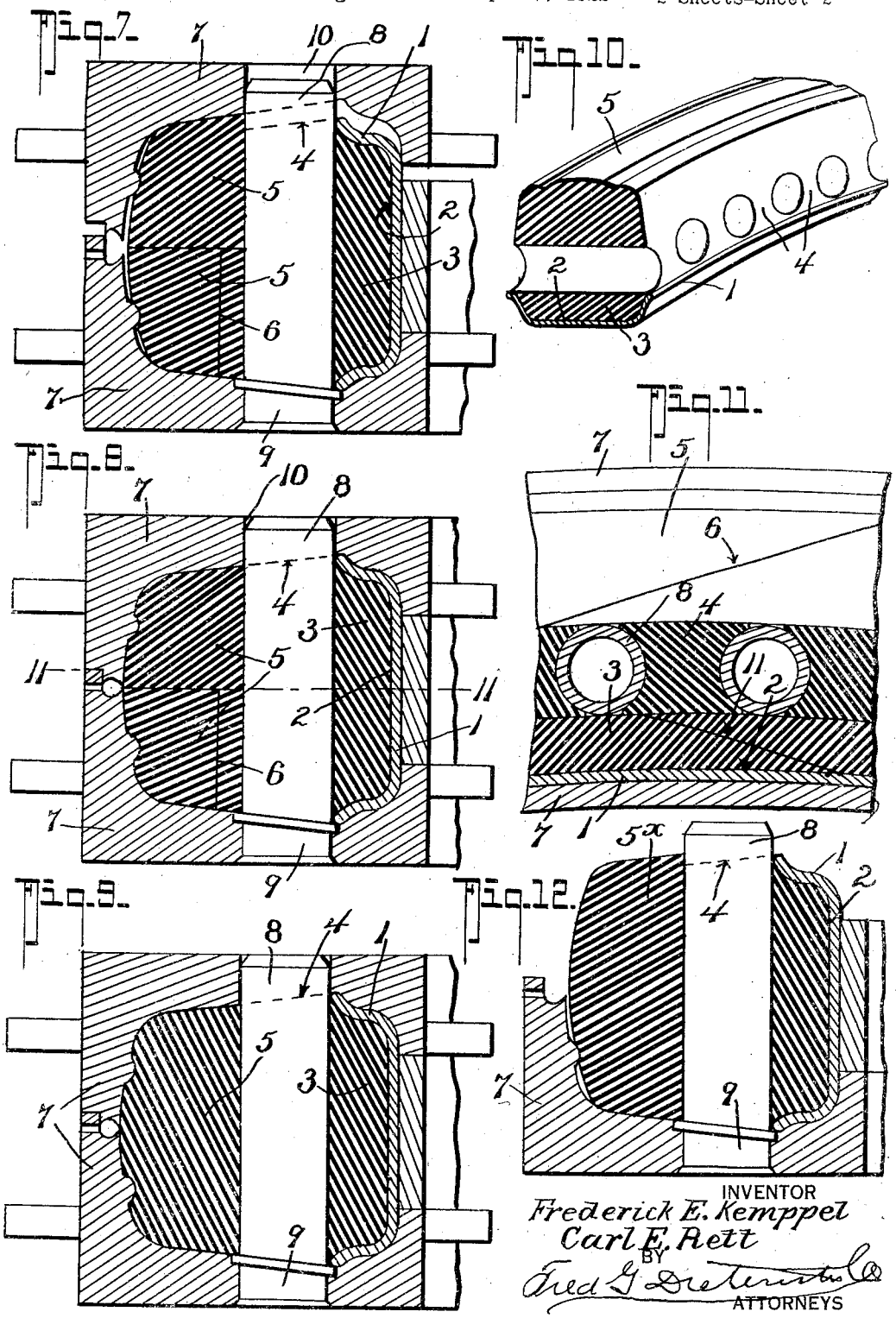

Patented June 8, 1926.

1,588,114

UNITED STATES PATENT OFFICE.

FREDERICK E. KEMPPEL AND CARL E. RETT, OF AKRON, OHIO, ASSIGNORS TO LAMBERT TIRE & RUBBER COMPANY, OF BARBERTON, OHIO, A CORPORATION OF ARIZONA.

METHOD OF MANUFACTURING TIRES.

Application filed September 7, 1922, Serial No. 586,648. Renewed April 29, 1926.

This invention relates to the art of tire building and more especially to the manufacture of that class of tires known as cushion tires.

The invention has for its objects to reduce the labor costs in the manufacture of tires of the kind stated and to provide a tire in which danger of air bubbles is avoided.

Generically the process consists in forming the base or rim section of the tire either in the usual manner by building it up of laminated rubber strips laid on top of one another around the rim or by die-expressing the rubber from a mill into a strip of the desired cross sectional form and dimensions and laying it around in the rim; then placing the rim with the base section in a vulcanizing mold and adding to it the remainder of the rubber body structure after having first die-expressed the remaining part or parts in preformed sections or portions which will lie and fit together in their proper places in the mold, cement being first spread on the rubber surfaces which are designed to lie together if desired; after thus assembling the preformed portions of the tire in the mold, the mold is closed and the contents thereof are placed under compression and put in a vulcanizing mold, thus causing the rubber to flow into the cavities of the mold and become vulcanized into an integral structure, it being understood that preferably the vulcanization occurs while the contents of the mold remain under pressure. It should also be understood that it is the preferable practice to brass plate the rim before attaching the rubber structure to it.

In its more detail nature, the invention also resides in the detailed steps and acts necessary to produce a finished tire, which steps and acts will be hereinafter first fully described and the invention specifically pointed out in the appended claims, reference being had to the accompanying drawings, in which:

Figure 1 is a detail sectional perspective view of a rim showing the base section built up in the same by the "laminated" process.

Figure 2 is a detail view, similar to Figure 1, showing the rim section of the tire made of a die-expressed or preformed strip.

Figure 3 is a detail sectional perspective view of one-half of a mold with the rim and rim section of a tire in place ready to receive the remainder of the tire body material.

Figure 4 is a perspective view of the die-expressed blocks used in building up a tire having transverse holes.

Figure 5 is a sectional perspective view similar to Figure 3 with the blocks in place and the first body band of die-expressed material of preformed cross section lying in position in the mold.

Figure 6 is a view similar to Figure 5 with the other preformed body section in place in the other half of the mold.

Figure 7 is a cross section of the mold and contents taken through one of the core pipes before the mold is closed tightly to apply pressure to the contents of the mold.

Figure 8 is a cross section of the mold and contents taken through one of the blocks, after the mold halves have been closed tightly and before vulcanization takes place.

Figure 9 is a view similar to Figure 8 after vulcanization.

Figure 10 is a detail sectional perspective view of a portion of a finished tire after it has been removed from the mold.

Figure 11 is a detail longitudinal sectional view on the line 11—11 of Figure 8.

Figure 12 is a detail cross section showing the body partly made of a single strip $5^x$ instead of two strips 5—5 as in Figures 5 and 6.

In the drawings in which like numerals of reference indicate like parts in all of the figures, 1 is the rim whose surface 2 is coated with brass so that the rim or base structure of the tire 3 will adhere to the rim. 4 designates the blocks of rubber located between adjacent holes and 5 designates the body sections or annular strips which are placed around the blocks 4 and overlap at 6, while 7—7 indicate the mold halves whose cavity is shaped and sized to give the proper configuration to the tire, the mold cavity having provision for receiving the rim and contents and having pins 8 preferably secured to one mold half and projecting into holes 10 in the other mold half when the mold halves are assembled. The type of mold employed in the process forms no part of the present invention.

In carrying out the invention, the rim 1 has its face 2 brass plated to cause a good adhesion of the rubber as before intimated and after this the base portion 3 of the tire is built up on the rim. In building up the base portion 3, the present process of taking thin bands or strips of rubber from the carding rolls and winding it around the rim one thickness upon another until the desired thickness has been attained may be employed or (and it is preferred) the rim or base portion 3 may be squeezed through a die into the required cross sectional form and, in that form, wound around the rim, the abutting ends of the piece being preferably lap jointed as at 11 (see Figure 8).

After the base portion of the tire has been placed on the rim as above described, the rim is placed in a half of the vulcanizing mold, the mold being laid down flat. When a tire having transverse holes is to be produced or a tire having recesses in its side walls, the mold half is provided with core pins 8. Rubber blocks 4 which have been formed by die-expressing the rubber in long strips and cutting the strips into proper lengths, are placed between adjacent cores 8 (see Figure 10) and then the remaining body portions of the tire are built up. This is done by die-expressing the rubber in a long strip of predetermined cross sectional form and cutting the strip to fit around the core pins 8 and blocks 4, such strip being indicated by the reference character 5 in the drawings and the joint between the ends of the strip being preferably a lap joint as at 6. The body portion of the tire may be formed of two strips 5—5, each occupying the depth of a mold half as shown in Figures 5 and 6 or it may be made in a single strip set into one mold half and adapted to be covered by the other mold half when the molds are assembled, as indicated in Figure 12, it being understood, of course, that the strips 5—5, whether made in two units or in a single unit, are pressed from the mill and through suitable dies which give to the rubber the desired predetermined cross sectional form.

Before the several parts of the tire structure are assembled as above described, those surfaces which are to lie in contact with one another may be covered with rubber cement or washed with benzine, although if the operator is careful not to soil the contacting surfaces, the use of cement or benzine may be found unnecessary.

When the body portion of the tire encircling the blocks 4 is to be made up of two annular sections, the second strip 5 may be laid in the second half of the mold before the mold halves are brought together as, in that way, opening up of the circle or ring of material at its lap jointed ends is prevented by the annulus of the mold but where the body portion 5—5 is made in one cross sectional piece, it will remain in position when laid in the lower half of the mold until the upper half of the mold has been placed in position.

It should be noted, especially where a ribbed or fancy tread is to be formed on the tire, the thickness in the direction of the radius of the tire of the strips 5—5 is made somewhat less than the finished thickness, while the width in the direction of the axis of the molds is made somewhat greater (see Figure 7) in order that when the mold halves are brought together with pressure, the material will flow and fill the recesses of the mold cavity.

After placing the parts in the mold and closing the mold tightly, the mold is placed in a vulcanizing kettle and the contents of the mold vulcanized according to the usual practice, which will thereby unite the various portions of the rubber in a homogeneous mass, obliterating the planes or surfaces of division between the several rubber sections of which the tire is built up.

Numerous modifications in the details of this method may be used to adapt it to the different forms of tires to be made and it is, therefore, not intended that the present invention be considered as limited to the specific order of steps of procedure or to the use of any particular type of mold.

What we claim is:

1. A method of manufacturing cushion tires which consists in taking a rim having a surface possessing an affinity for rubber, placing a rim filler or tire base in the rim, placing the rim with its contents in a vulcanizing mold having a cavity of the desired tire form and capacity, building up the remainder of the tire body by laying preformed die expressed annular sections of rubber in the mold and lap jointing the ends, closing the mold and vulcanizing the contents while under pressure.

2. A method of manufacturing cushion tires which consists in taking a rim having a surface possessing an affinity for rubber, placing a rim filler or tire base in the rim, placing the rim with its contents in a vulcanizing mold having a cavity of the desired tire form and capacity, building up the remainder of the tire body by laying preformed die expressed annular sections of rubber in the mold and lap jointing the ends after having first applied to the engaging surfaces of the rubber parts a coating of rubber cement, closing the mold and vulcanizing the contents thereof.

3. A method of manufacturing cushion tires which consists in taking a rim having a surface possessing an affinity for rubber, placing a rim filler or tire base in the rim, placing the rim with its contents in a vulcanizing mold having a cavity of the desired tire form and capacity and having core pins passing through the same, placing die-expressed blocks between the core pins and placing die-expressed annular sections of rubber in the mold and lap jointing their ends to substantially fill the same, said sections being of definite preformed cross sectional shape and size, closing the mold and applying pressure to the contents thereof and then vulcanizing the contents of the mold.

4. The method of building cushion tires which consists in taking a rim, placing thereon a preformed filler strip of the proper cross sectional shape and dimensions to fit the rim, placing the rim and its contents in a mold, filling the remainder of the mold with preformed strips and lap jointing their ends, applying compressing pressure to the mass and vulcanizing the mass while under pressure.

5. The method of building cushion tires which consists in taking a rim having a surface possessing an affinity for rubber, die-expressing a strip of rubber of the cross sectional size to fit and fill in the rim, placing said strip around in the rim, cutting its ends so as to join together, die-expressing the remainder of the tire body and laying it around the base in the mold and lap jointing the ends, closing the mold to squeeze the contents and vulcanizing the same while under pressure.

6. A method of manufacturing cushion tires which consists in taking a rim having a surface possessing an affinity for rubber, die-expressing a strip of rubber of the cross sectional shape to fill in the rim, placing said strip around the rim, cutting its ends so as to join together, placing a series of hole-forming pins around said strip, die-expressing blocks of rubber and placing them crosswise between adjacent pins for occupying the space between said pins, die-expressing the remainder of the tire body and laying it around the pins and blocks of rubber, lap-jointing the ends of said remainder of the tire body, confining the mass in a vulcanizing mold and closing the mold to squeeze the contents, and vulcanizing the contents of the mold while under squeezing pressure.

FREDERICK E. KEMPPEL.
CARL E. RETT.